United States Patent [19]
Chiang

[11] Patent Number: 5,432,427
[45] Date of Patent: Jul. 11, 1995

[54] BATTERY CHARGING CONTROL SYSTEM
[76] Inventor: Chih-Cheng Chiang, P.O. Box 96-173, Taipei, Taiwan
[21] Appl. No.: 158,302
[22] Filed: Nov. 29, 1993
[51] Int. Cl.⁶ .............................................. H02J 7/04
[52] U.S. Cl. ......................................... 320/32; 320/40
[58] Field of Search ..................... 320/31, 32, 35, 36, 320/39, 40

[56] References Cited
U.S. PATENT DOCUMENTS

| | | | |
|---|---|---|---|
| 4,061,956 | 12/1977 | Brown et al. | 320/39 X |
| 4,656,411 | 4/1987 | Carlson | 320/40 X |
| 4,792,743 | 12/1988 | Tsujino et al. | 320/31 X |
| 4,820,965 | 4/1989 | Siemer | 320/31 |
| 5,166,595 | 11/1992 | Leverich | 320/32 |

Primary Examiner—Kristine L. Peckman
Attorney, Agent, or Firm—Larson and Taylor

[57] ABSTRACT

A battery charging control system includes an external power supply charging sub-system consisting of a power input automatic regulator, a current input control gate circuit, a first high-frequency full-wave rectifier, and a master control IC, and operated to charge a battery set according to the voltage of the battery set. Also, a light energy charging sub-system consisted of a light energy/electric power converter, an overvoltage protection control circuit, a second high-frequency full-wave rectifier, a current inductor, a temperature control gate circuit and the aforesaid master control IC, and controlled to charge the battery set according to the power level and temperature of the battery set.

17 Claims, 8 Drawing Sheets

BATTERY CHARGING CONTROL SYSTEM

BACKGROUND OF THE INVENTION

The present invention relates to a battery charging control system, and more particularly relates to a battery charging control system which automatically monitors the temperature, voltage, and power level of a battery set so as to charge the battery set automatically and properly according to the conditions monitored without causing any damage to the battery set.

Mobile telephones have become more and more popular because of the advantage of mobility. Various types of rechargeable batteries including nickel-cadmium, nickel-hydrogen, and lithium batteries have been disclosed for use in mobile telephones. These mobile telephone battery have drawbacks as follows:

1) Limited battery capacity limits the working time of the mobile telephone. If one tries to increase the capacity of the battery, one must increase, relatively, the size of the battery. This will thereby affect the mobility of the mobile telephone.
2) Simply increasing the capacity of the battery cannot provide the mobile telephone with unlimited power supply, and therefore spare batteries must be available.
3) It is inconvenient to charge the battery of a mobile telephone, and it is also difficult to obtain an external power supply for charging the battery.
4) It takes a long time to fully charge the battery of a mobile telephone (normally about 10 hours). The use of a rapid battery charging charger may produce high temperatures, causing the battery to be damaged.
5) It consumes energy when an external power supply is employed to charge the battery of a mobile telephone.
6) According to conventional battery charging methods, there exists the problem of a battery's "memory effect", which cause the capacity of the battery reduced or even causes the battery to be damaged. The battery's "memory effect" happens when the battery is charged before its power supply is completely used up or when an electric leakage has occurred. Because the voltage of the battery drops when it is at a low power state or when an electric leakage happens, the residual volume of power of the battery will be memorized when it is charged with an external power supply of a higher voltage. This residual volume of power will occupy the capacity of the battery causing the available capacity of the battery to be reduced. The accumulation of such residual volumes of power will finally cause the battery to become unchargeable. When the battery becomes unchargeable, the user must replace the battery of the mobile telephone with a new battery.
7) Conventional batteries cannot be charged with full load current or high voltage when the temperature of the batteries is below 5° C. or over 50° C. When the temperature of a conventional battery is below 5° C. or over 50° C., it will be damaged when charged with a full load current or a high voltage.

SUMMARY OF THE INVENTION

The present invention has been designed to provide a battery charging control system which eliminates the aforesaid drawbacks. The features and advantages of the battery charging control system are as follows:

1) It has a high voltage regulation and control protection to maintain the battery voltage within 12V±4V, the battery current at 1A, and the volume of battery power within a normal level.
2) It automatically regulates the voltage and current of charging power supply when the temperature of the battery increases during the rapid charging mode.
3) It automatically regulates the voltage of the charging power supply when the temperature of the battery is below 5° C. or over 50° C.
4) It automatically monitors the conditions of the battery so as to automatically regulate the charging power supply to charge the battery according to its conditions. Therefore, the battery charging control system is practical and safe in use. Under the rapid mode, a battery can be charged to the saturated status within about one hour.
5) Because the battery charging control system monitors the battery to be charged and then charges it automatically according to the conditions of the battery monitored, the battery charging control system is suitable for charging any of a variety of conventional-rechargeable batteries.
6) Any light source can be used for charging batteries, and batteries can be charged while they are being used.
7) The light energy collector panel can be made according to the desired shape and size to effectively collect the light energy for charging the batteries rapidly.
8) It automatically cuts off the circuit when the controlled battery set is at the saturated status.
9) It eliminates the problem of "memory effect"; and therefore the service life of the controlled battery set is prolonged.
10) The controlled battery set, can be charged either with light energy or an external power supply.

DETAILED DESCRIPTION OF THE PREFERRED EMBODIMENT

Figure 1:
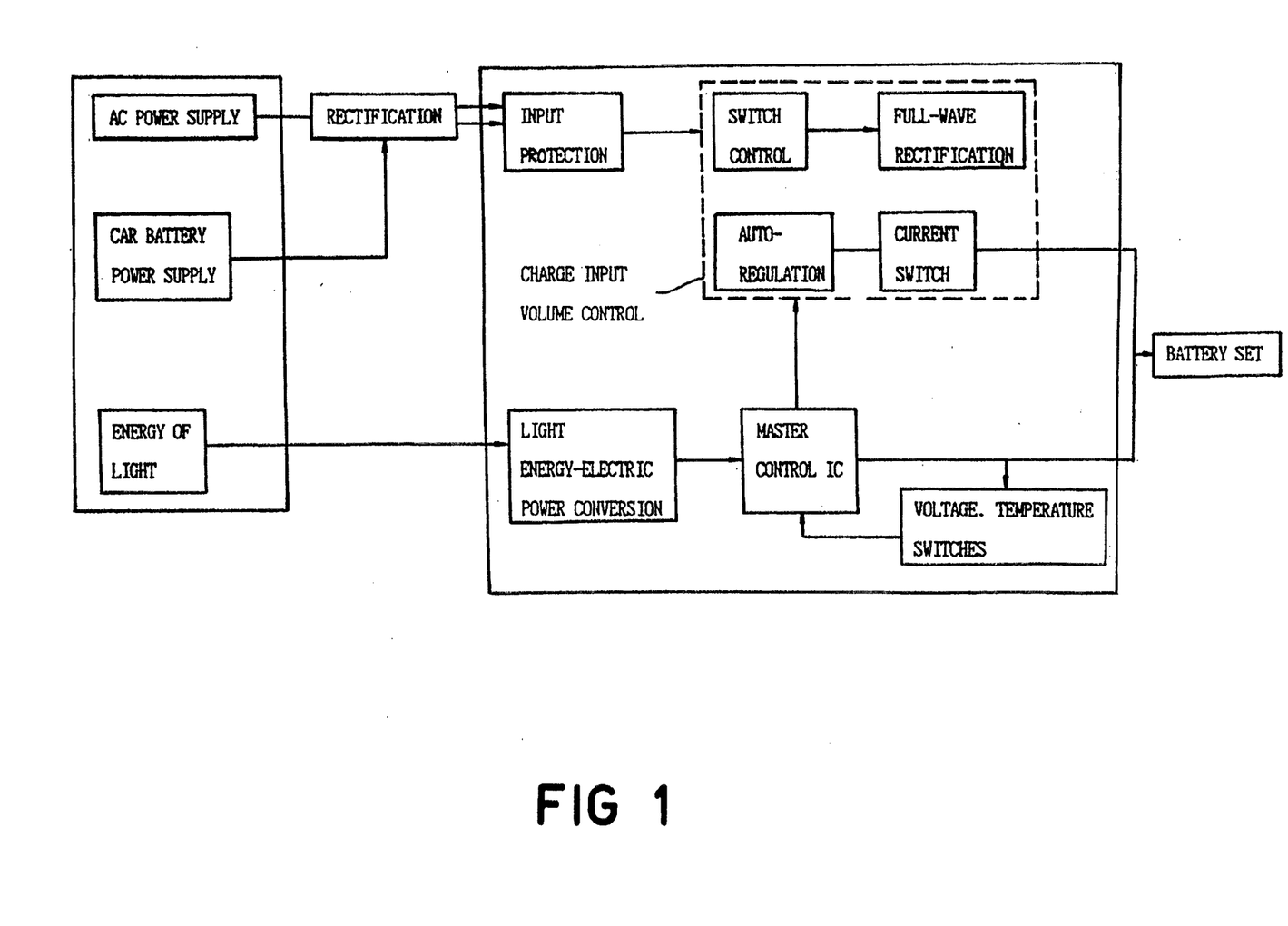
FIG. 1 is an electrical block diagram showing the operation of the present invention.

Referring to FIG. 1, there is depicted a system block diagram of a battery charging control system in which electrical power can be supplied from an external power supply (Ac power supply or car battery power supply) or the radiant energy of light and used for charging batteries. When the external power supply is used, it is rectified and monitored through an input power protection circuit, then processed through a charge input volume control system. The charge input volume control system consists of a switch control, an auto-regulator, a full-wave rectifier, and a power switch. The power is then controlled by voltage and temperature switches and the master control IC, and then sent to charge the batteries. When the radiant energy of light is used, it is first converted into electric power, processed through the charge input volume control system and then controlled by the voltage and temperature switches and the master control IC, and then sent to charge the batteries.

Figure 2:
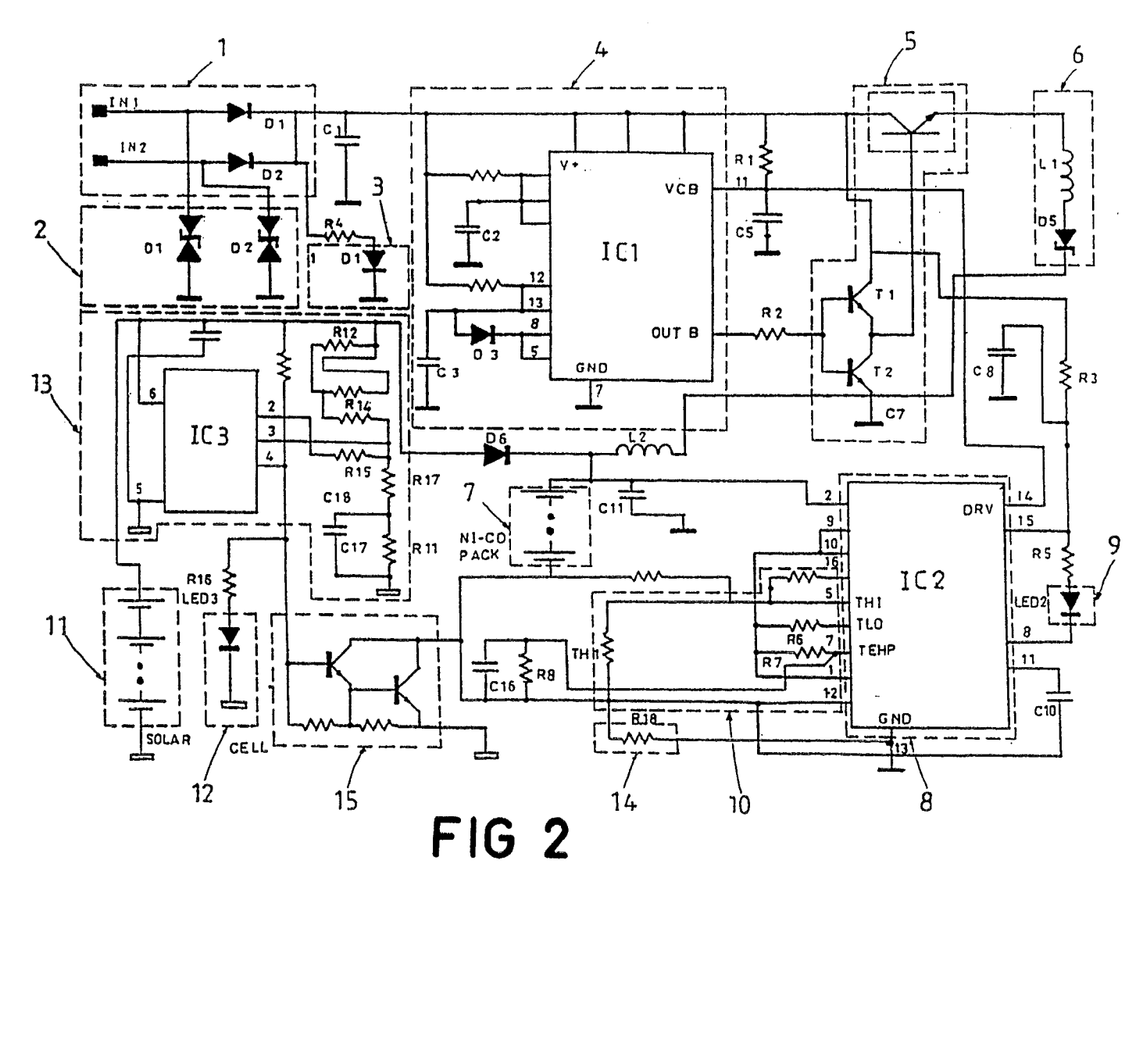
FIG. 2 is an electrical circuit diagram of the battery charging control system of the preferred embodiment of the present invention.
Figure 3:
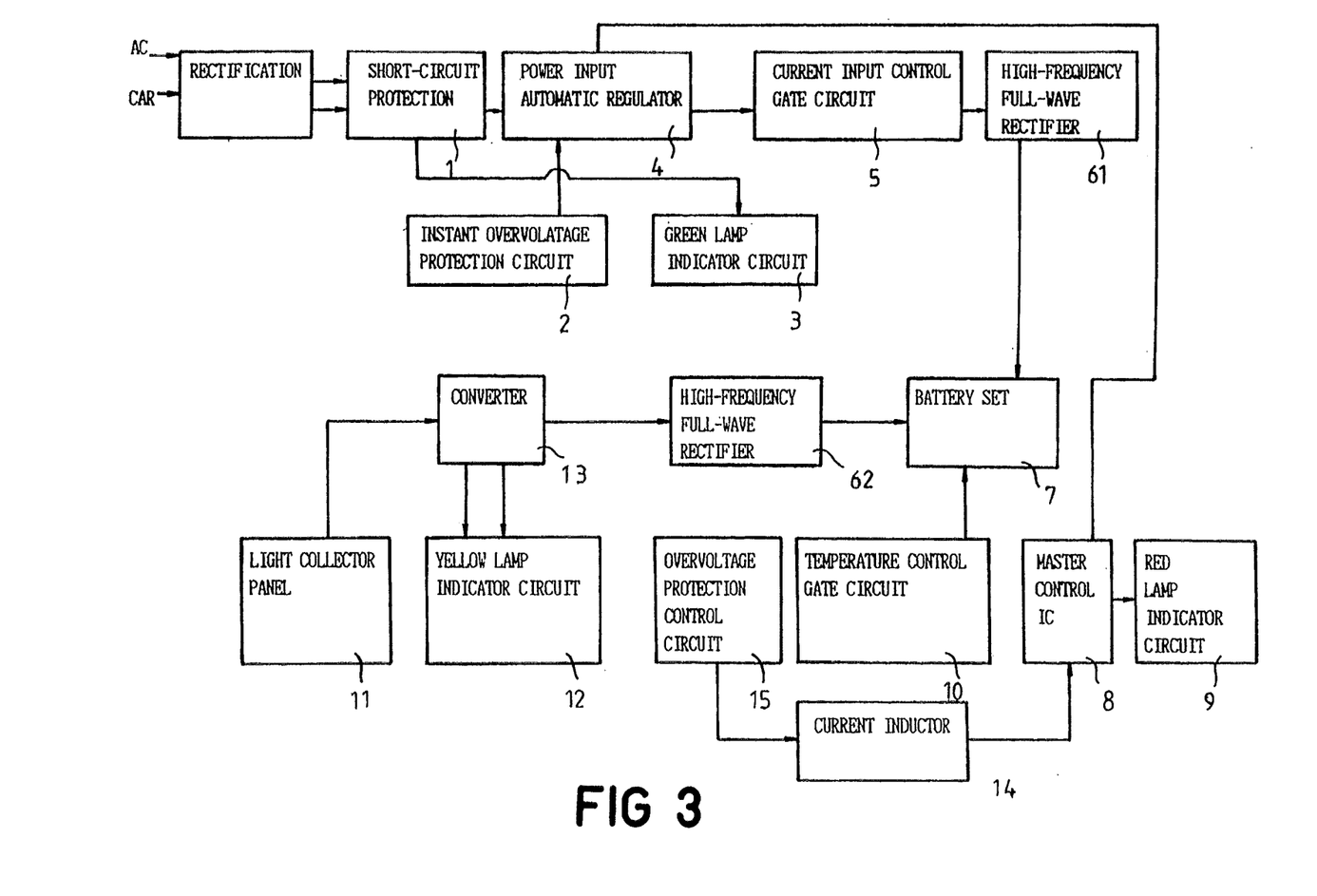
FIG. 3 is an operational flow chart of the battery charging control system of FIG. 2.

Referring to FIGS. 2 and 3, a battery charging control system in accordance with the preferred embodiment of the present invention is generally comprised of a short-circuit protection circuit 1, an instant overvoltage protection circuit 2, a green lamp indicator circuit 3, a power input automatic regulator 4, a current input control gate circuit 5, a first high-frequency full-wave rectifier 61, a second high-frequency full-wave rectifier 62, a battery set 7, a master control IC 8, red lamp indicator circuit 9, a temperature control gate circuit 10, a light collector panel 11, a yellow lamp indicator circuit 12, a converter 13, a current indicator 14, and an overvoltage protection control circuit 15.

The short-circuit protection circuit 1 is to protect the battery set 7 in case of short circuit of external power supply during its charging to the battery set 7.

The instant overvoltage protection circuit 2 is to prohibit surge from damaging the battery set 7 as external power supply is used to charge the battery set.

The master control IC 8 is to monitor the power state of the battery set 7 and receive external signals, and to control the power input automatic regulator 4 in forming a charging circuit.

The power input automatic regulator 4 incorporates with the master control IC to decode charging power supply, and to automatically regulate the volume of charging power supply according to the power state of the battery set 7 and then to provide a corresponding signal to the current input control gate circuit 5 in informing it of the correct information.

The current input control gate circuit 5 works according to the instruction of the power input automatic regulator 4 to let a proper volume of power supply pass to the battery set 7 or to stop power supply from passing to the battery set 7.

The first and second high-frequency full-wave rectifiers 61, 62 are to fully rectify charging power supply into DC power supply for charging the battery set 7.

The converter 13 is to convert the radiant energy of light collected from the light collector panel 11 into electrical power.

The overvoltage protection control circuit 15 is to monitor the voltage of power supply obtained from the converter 13 so as to provide a suitable charging voltage for charging the battery set 7.

The current inductor 14 indicator detects the change of the power supply at the battery set 7 and sends the detected result to the master control IC 8 causing it to give an instruction to charge or stop charging the battery set 7. In this way therefore the battery memory effect can be eliminated.

The temperature control gate circuit 10 is to detect temperature for permitting charging power supply to be regulated according to the condition of temperature, so as to eliminate the influence of temperature on the battery set 7 during charge charging.

The green, yellow, red lamp indicator circuits 3;12;9 are for indicating the working status of the battery charging control system; the green and red lamp indicator circuits are turned on during the rapid charging mode; the green lamp indicator circuit is turned on during the slow charging mode; the yellow lamp indicator circuit is turned on when the radiant energy of light is converted into electrical power and employed to charge the battery set.

The light collector panel 11 is molded from plastics according to the desired shape.

The charging operations, control actions, and effects of the battery charging system of the present invention are outlined hereinafter.

A. Charging of light energy (see FIGS. 2, 4, and 4A)

Figure 4:
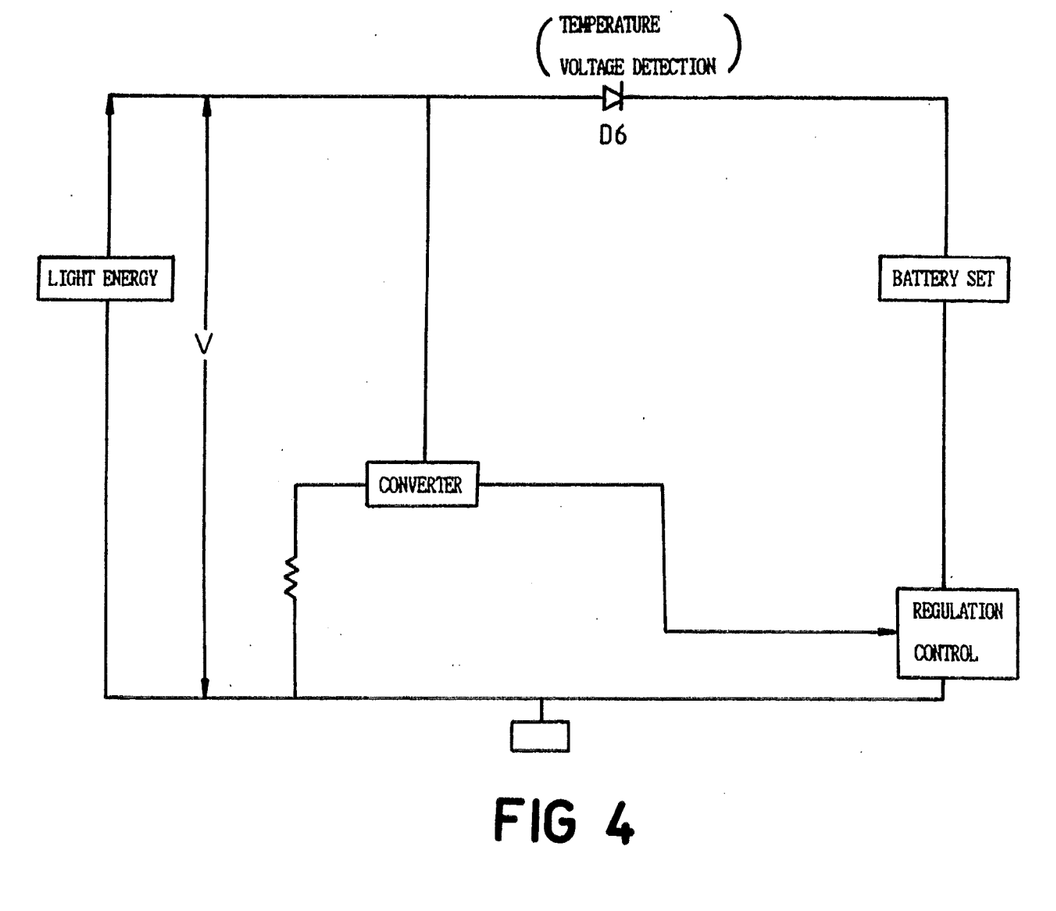
FIG. 4 is a control block diagram showing the operation of the battery charging control system of FIG. 2 in using light energy to charge the battery set.
Figure 4A:
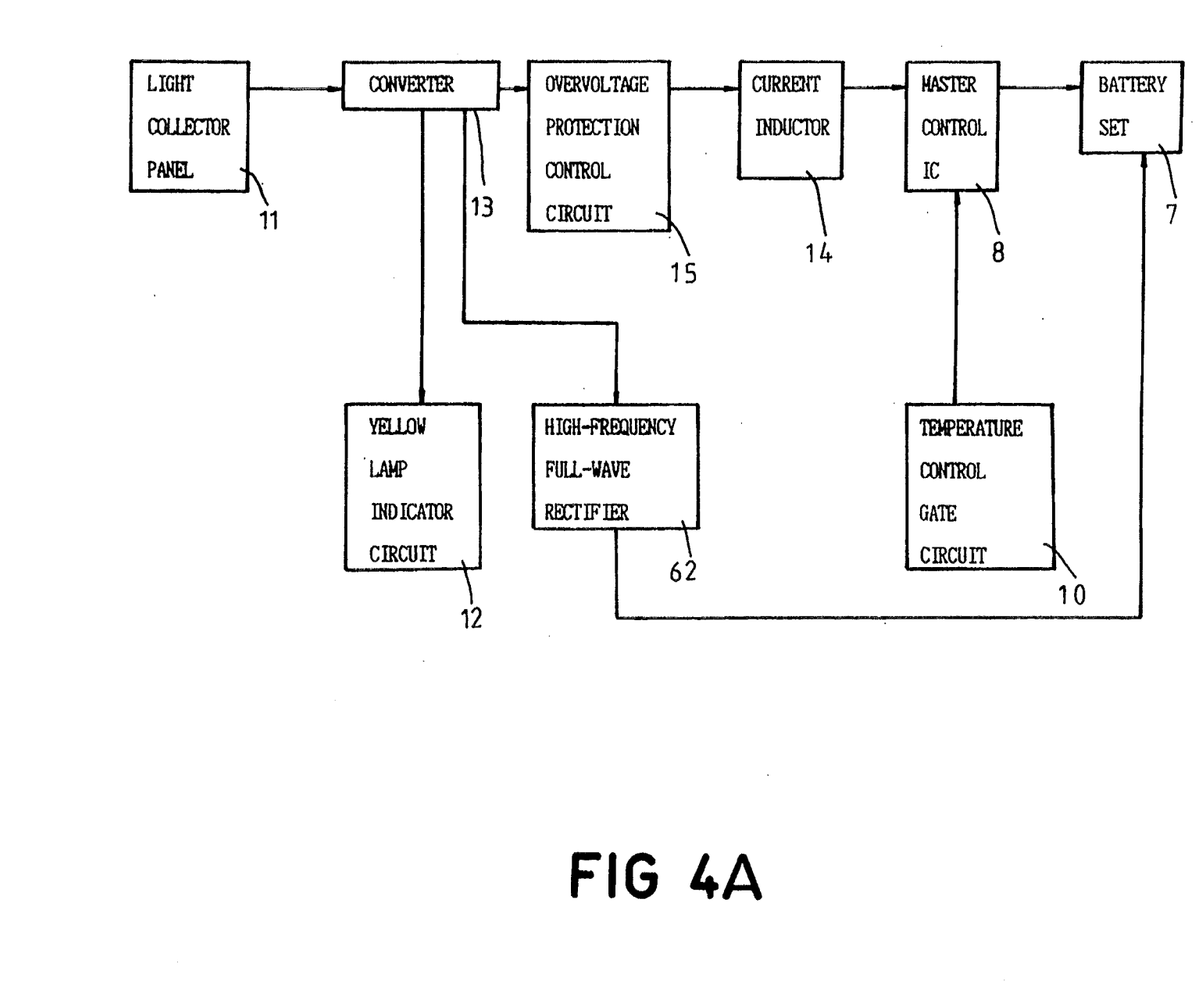
FIG. 4A is an electrical circuit block diagram of the light energy charging subsystem of the battery charging control system of FIG. 2.

The radiant energy of light is collected through the light collector panel 11, then converted into electrical power through the converter 13. At the same time, the yellow lamp indicator circuit 12 is turned on. Electrical power from the converter 13 is turned into DC-power supply by the second high-frequency full-wave rectifier 62. DC power supply from the high-frequency full-wave rectifier 62 is controlled by the overvoltage protection control circuit 15 to provide a suitable charging voltage for the battery set 7. At the same time, the master control IC 8 is controlled by the current inductor 14 and the temperature control gate circuit 10 to provide a suitable output in forming a charging circuit to charge the battery set 7. The charging of light energy is made according to V (charge charging input volume)=V1 (volume of external power+supply)−V2 (existing power level of the battery set)+Vd (the volume set according to temperature). In FIG. 4, D6 indicates a diode which detects temperature and voltage for reference in controlling .the input volume of charging power supply. The current inductor 14 detects the power state of the battery set 7 to see if it reaches the critical point, so as to actuate the master control IC according to the detection result. Therefore the battery charging control system can automatically regulate the charging power supply to automatically charge the battery set.

B. Charging of external power supply (AC or car battery power supply) (see FIGS. 2, 5, and 5A)

Figure 5:
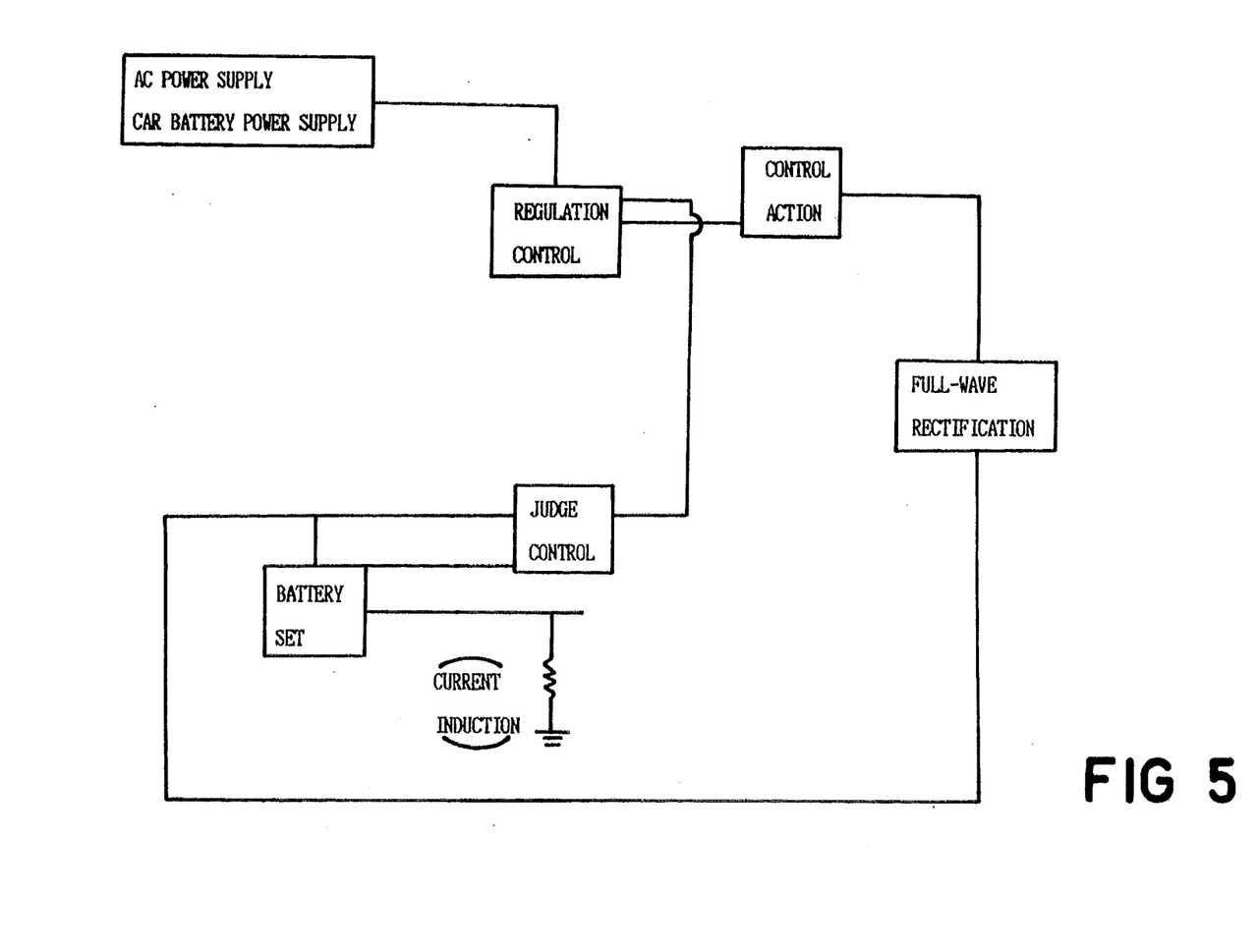
FIG. 5 is a control block diagram showing the operation of the battery charging control system of FIG. 2 in using external power supply to charge the battery set.
Figure 5A:
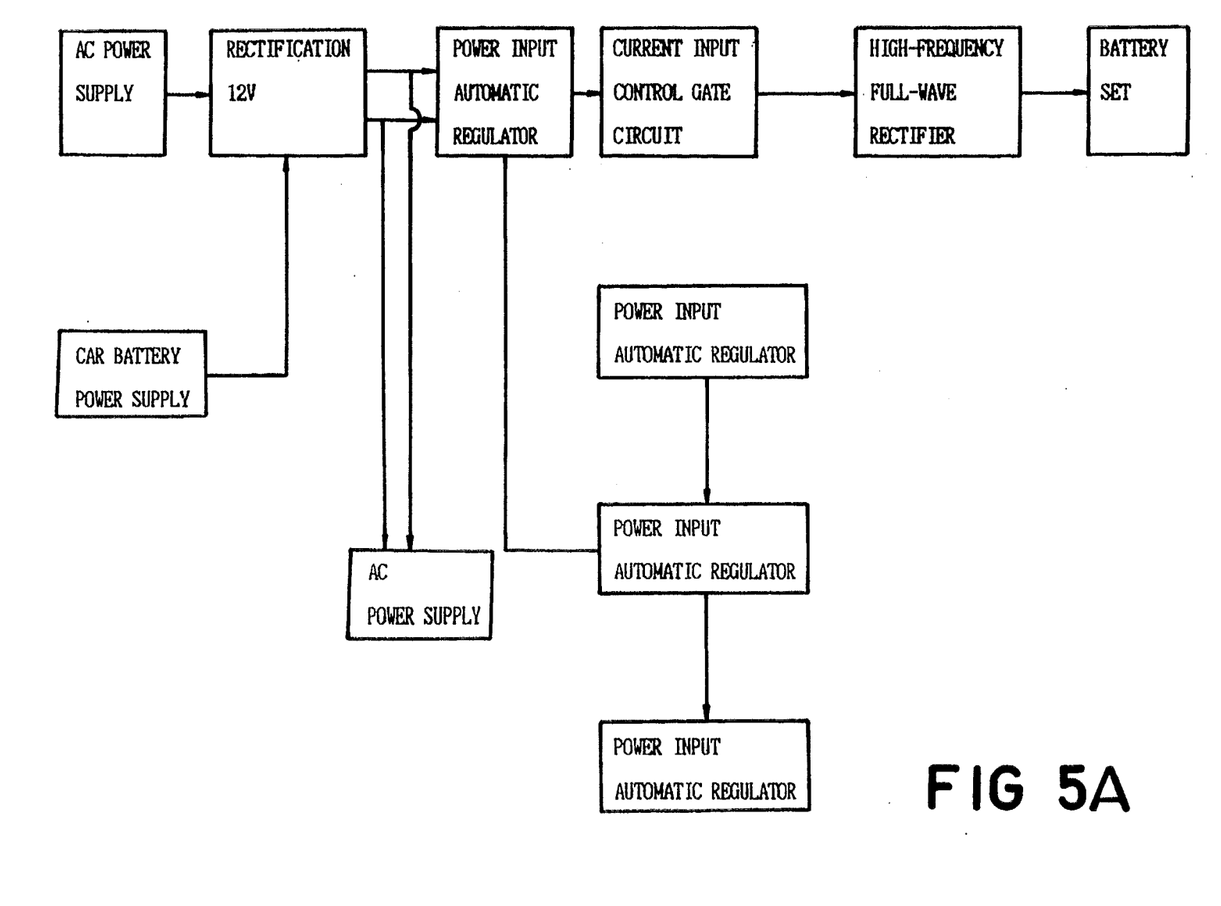
FIG. 5A is an electrical circuit block diagram of the external power supply charging subsystem of the battery charging control system of FIG. 2.

When external power supply is rectified into 12V input power supply, the green lamp indicator circuit 3 is turned on. . At the same time, the master control IC 8 receives the signal from the temperature control gate circuit 10 to drive the power input automatic regulator 4 causing it to control input power supply to the current input control gate circuit 5 according to current power state and temperature of the battery set 7. Input power supply from the current input control gate circuit 5 is then treated through the first high-frequency full-wave rectifier 61 and then sent to charge the battery set 7. While charging, the red lamp indicator circuit 9 is turned on. By means of the operation of the power input automatic regulator 4, the current input control gate circuit 5, and the temperature control gate circuit 10, charging power supply is monitored, regulated, and controlled before charging the battery set 7.

C. Temperature charging control

Because of the limitation of materials, the charging temperature of the battery set 7 must be controlled within 5° C. to 50° C. When temperature increases 1° C., the voltage is changed by 15 mV. The temperature of the battery set 7 is directly proportional to the voltage and current of charging power supply. Therefore, the current of charging power supply must be controlled within a low level during an abnormal temperature condition so that the battery set 7 will not be damaged. The minimum current input value according to the present invention is set at 0.1 mA. Under normal conditions, charging current is set within 50 mA to 350 mA. When external temperature is below 5° C. or over 50° C., the current indicator 14, the TH1 of the temperature control gate circuit 10, and the TH1, TL0, TEMP of the master control IC 8 work, permit input power supply to charge the battery set at a low current level (about 0.1 mA). This charging control needs a relatively longer charging time, however, it effectively protects the battery set 7.

D. Elimination of memory effect

Figure 7:
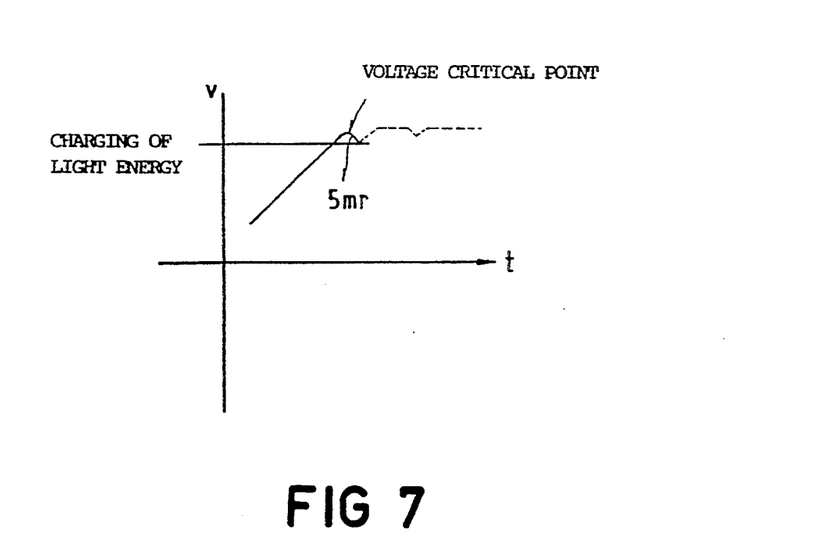
FIG. 7 is a graph showing the automatic charging operation of the battery charging control system of FIG. 2 at the voltage critical point to eliminate the occurrence of "memory effect".

The "memory effect" occurs when a battery is charged before it has a zero voltage (the battery still has a small amount of residual voltage which is not enough to be effective). The accumulation of this memory effect gradually reduces the chargeable capacity of the battery. If a battery is charged by a higher voltage (for example: 12 V) when it still has a small volume of power supply at low voltage level (for example: 8 V), the existing small volume of power supply at low voltage level will dull the memory. Therefore, the control of charging voltage determines the occurrence of "memory effect". This memory effect is eliminated by the battery charging control system of the present invention., As shown in FIG. 7, if the voltage detected by the current indicator 14 is below the predetermined voltage critical point when the battery set 7 does no work, the master control IC 8 will instruct to charge the battery set 7 with the same voltage level once the detected voltage fell within 5 mV. Therefore, no residual low voltage power supply exists in the battery set 7. Because the battery set 7 is constantly charged with the same voltage level, the problem of "memory effect" is eliminated.

E. Charging while consuming (See FIG. 6)

Figure 6:
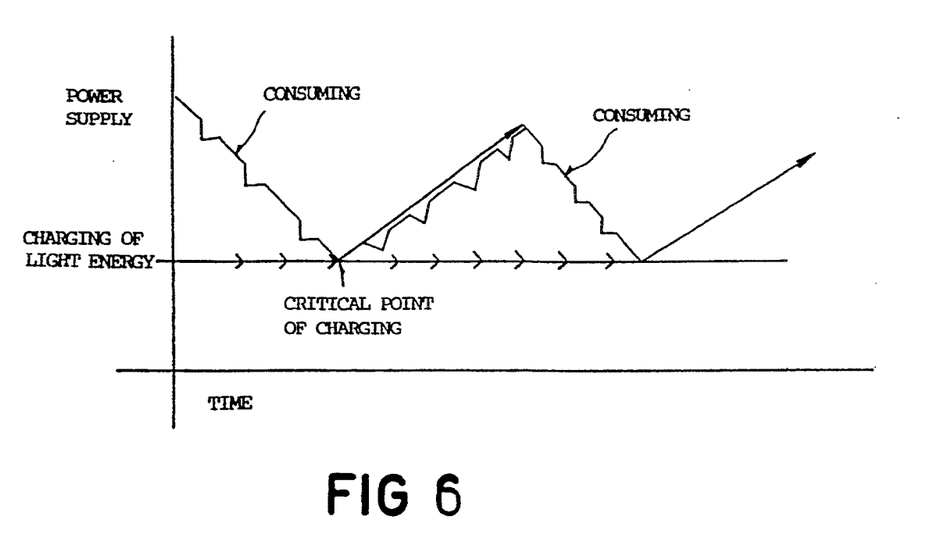
FIG. 6 is a graph showing the charging curve during the operation of the battery charging control system of FIG. 2 when charging the battery set automatically.

When battery power supply drops to the critical point of charging, the current indicator 14 actuates the master control IC 8, causing the light energy charging system (see FIG. 4) to charge the battery set 7, and therefore the power supply volume of the battery set 7 is increased. Therefore the battery power supply of the battery set 7 is constantly maintained over the critical point of charging, and the voltage of charging power supply is maintained equal to the voltage at the critical point of charging. Therefore, the battery charging control system of the present invention automatically charges the battery set 7 to keep the battery power supply above the working level, and effectively prevents the battery's "memory effect".

F. High charging efficiency

According to tests, when input charging voltage $V_{in} = 12.05$ V and input charging current $I_{in} = 0.925$ A, the input charging power $P_{in} = 12.05 \times 0.925 = 11.15$ W. After the completion of the charging process, the output voltage $V_{out} = 10.6$ V and the output current $I_{out} = 0.956$ A, therefore the output power $P_{out} = 10.6 \times 0.956 = 10.13$ S; $WP_{out} = P_{in} - P_{out} = 11.15$ W $- 10.13$ W $= 1.02$ W, and therefore the working efficiency $= WP_{out}/P_{in}\% = 91.47\%$, i,e., about 92%. In comparison with the average charging efficiency of regular battery charging systems, which is about 80%, the charging efficiency of the present invention is about 12% superior over regular battery charging systems.

As indicated, the present invention provides a battery charging control system which monitors the conditions of the battery set and automatically charges it according to the conditions detected so that the service life of the battery set is prolonged, and the problem of "memory effect" is eliminated.

What is claimed is:

1. A battery charging control system for charging a battery with a charging power from a power source and comprised of means for connecting said battery charging control system to an external power supply;

a short-circuit protection circuit which protects the battery in case of a short circuit in the external power supply during the charging of the battery;

an instant overvoltage protection circuit which prohibits an electrical surge from damaging the battery when the external power supply is used to charge the battery;

a power input automatic regulator;

a master control IC which monitors the power state of the battery and controls said power input automatic regulator in forming a charging circuit to charge the battery;

a current input control gate circuit, said power input automatic regulator cooperating with said master control IC to monitor the charging power, and to automatically regulate the volume of charging power according to the power state of the battery and then to provide a corresponding control signal to said current input control gate circuit; said current input control gate circuit responding to said control signal to let a proper volume of charging power pass to the battery or to stop the charging power from passing to the battery;

a high-frequency full-wave rectifier means for fully rectifying the charging power into a DC power supply for charging the battery;

a converter which converts the radiant energy of light collectable from a light source into electrical power for charging the battery;

an overvoltage protection control circuit which monitors the voltage of said converter so as to provide a signal used to provide suitable charging voltage for charging the battery;

a current indicator detects the change of the power at the battery and then sends a signal to said master control IC causing it to give an instruction to charge or stop from charging the battery;

a temperature control gate circuit; detects the temperature for permitting charging power to be regulated according to the condition of the temperature, so as to minimize the influence of temperature on the battery during the battery charging; and a first, second and third lamp indicator means for indicating the working status of the battery charging control system, said first and third lamp indicator means being turned on during a rapid charging mode, said first lamp indicator means being turned on during a slow charging mode, and said second lamp indicator means being turned on when the radiant energy of the light source is being converted into electrical power and employed to charge the battery.

2. The battery charging control system of claim 1 wherein when the light source is employed to charge the battery, said overvoltage protection control circuit and said second high-frequency full-wave rectifier and said current indicator and said temperature control gate circuit and said master control IC are combined into a charging circuit to charge the battery.

3. The battery charging control system of claim 1 wherein when the external power supply is employed to charge the battery, said power input automatic regulator and said current input control gate circuit and said first high-frequency full-wave rectifier and said master control IC are combined into a charging circuit to charge the battery.

4. The battery charging control system of claim 1 wherein the input charging power is rectified by said first or second high-frequency full-wave rectifier into pure direct current power for charging the battery.

5. The battery charging control system of claim 1 wherein during the charging from the external power supply, the voltage of the input charging power is controlled by said power input automatic regulator and said current input control gate circuit and said master control IC to charge the battery, and said current indicator detects the power state of the battery for permitting the input charging power to charge the battery according to the detected power state of the battery.

6. The battery charging control system of claim 1 wherein when battery temperature is below 5° C. or over 50° C. during charging, said current indicator and said temperature control gate circuit and said master control IC control the voltage and current level of the charging power so as to charge the battery under a low current level of 0.1 mA at a slow speed without damaging the battery.

7. A battery charging control system for charging a battery with a charging power from a power source and comprised of means for connecting said battery charging control system to an external power supply;

a power input automatic regulator which can receive power from the external power supply;

a master control IC which monitors the power state of the battery and controls said power input automatic regulator to control the charging of the battery;

a current input control gate circuit, said power input automatic regulator cooperating with said master control IC to monitor the charging power and to automatically regulate the volume of charging power according to the power state of the battery and to provide a corresponding control signal to said current input control gate circuit, said current input control gate circuit responding to said control signal to let a proper volume of charging power pass to the battery or to stop the charging power from going to the battery;

a converter which converts the radiant energy of light collectable from a light source into electrical power for charging the battery;

a current indicator detects the change of the power at the battery and then sends a signal to said master control IC causing it to give an instruction to charge or stop from charging the battery; and a temperature control gate circuit detects the temperature of the battery for permitting charging power to be regulated according to the temperature, so as to minimize the influence of temperature on the battery during the battery charging.

8. The battery charging control system of claim 7 and further including a short-circuit protection circuit which protects the battery in case of a short circuit in the external power supply during the charging of the battery.

9. The battery charging control system of claim 8 and further including an instant overvoltage protection circuit which prohibits an electrical surge from damaging the battery when the external power supply is used to charge the battery.

10. The battery charging control system of claim 9 and further including a high-frequency full-wave rectifier means for fully rectifying the charging power into a DC power supply for charging the battery.

11. The battery charging control system of claim 10 and further including an overvoltage protection control circuit which monitors the voltage of said converter so as to provide a signal used to provide suitable charging voltage for charging the battery.

12. The battery charging control system of claim 11 and further including a first, second and third lamp indicator means for indicating the working status of the battery charging control system, said first and third lamp indicator means being turned on during a rapid charging mode, said first lamp indicator means being turned on during a slow charging mode, and said second lamp indicator means being turned on when the radiant energy of the light source is being converted into electrical power and employed to charge the battery.

13. The battery charging control system of claim 7 and further including an instant overvoltage protection circuit which prohibits an electrical surge from damaging the battery when the external power supply is used to charge the battery.

14. The battery charging control system of claim 7 and further including a high-frequency full-wave rectifier means for fully rectifying the charging power into a DC power supply for charging the battery.

15. The battery charging control system of claim 7 and further including an overvoltage protection control circuit which monitors the voltage of said converter so as to provide a signal used to provide suitable charging voltage for charging the battery.

16. The battery charging control system of claim 7 and further including a first, second and third lamp indicator means for indicating the working status of the battery charging control system, said first and third lamp indicator means being turned on during a rapid charging mode, said first lamp indicator means being turned on during a slow charging mode, and said second lamp indicator means being turned on when the radiant energy of the light source is being converted into electrical power and employed to charge the battery.

17. The battery charging control system of claim 7 wherein when battery temperature is below 5° C. or over 50° C. during charging, said current indicator and said temperature control gate circuit and said master control IC control the voltage and current level of the charging power so as to charge the battery at a low current and at a slow speed.

* * * * *